US012334257B2

(12) United States Patent
Zheng et al.

(10) Patent No.: US 12,334,257 B2
(45) Date of Patent: Jun. 17, 2025

(54) EXPANSION VALVE COIL ASSEMBLY

(71) Applicant: ZHEJIANG DUNAN ARTIFICIAL ENVIRONMENT CO., LTD., Shaoxing (CN)

(72) Inventors: Lifeng Zheng, Shaoxing (CN); Bin Wei, Shaoxing (CN); Qingjun Zeng, Shaoxing (CN); Jiyou Zhang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 813 days.

(21) Appl. No.: 17/440,771

(22) PCT Filed: Apr. 14, 2020

(86) PCT No.: PCT/CN2020/084661
§ 371 (c)(1),
(2) Date: Sep. 18, 2021

(87) PCT Pub. No.: WO2020/211744
PCT Pub. Date: Oct. 22, 2020

(65) Prior Publication Data

US 2022/0181057 A1 Jun. 9, 2022

(30) Foreign Application Priority Data

Apr. 15, 2019 (CN) ........................ 201920507947.X

(51) Int. Cl.
*H01F 7/08* (2006.01)
*F25B 41/345* (2021.01)
(Continued)

(52) U.S. Cl.
CPC ........... *H01F 7/081* (2013.01); *F25B 41/345* (2021.01); *H01F 7/126* (2013.01); *F25B 41/31* (2021.01)

(58) Field of Classification Search
CPC .......... H01F 7/081; H01F 7/126; F25B 41/31; F25B 41/345
(Continued)

(56) References Cited

U.S. PATENT DOCUMENTS 5,307,038 A * 4/1994 Ishimaru ............... F16D 27/112
336/107
2010/0328004 A1* 12/2010 Wei ......................... H01F 7/126
336/96

FOREIGN PATENT DOCUMENTS

CN 203480975 U 3/2014
CN 204372272 U 6/2015
(Continued)

OTHER PUBLICATIONS

The extended European search report of EP20790438.4.
(Continued)

*Primary Examiner* — Joel M Attey

(57) ABSTRACT

Disclosed is an expansion valve coil assembly, comprising a coil unit and a housing, wherein the coil unit is provided with a mounting platform, the mounting platform is provided, in a partially protruding manner, with a connecting part, and the housing is sheathed over the connecting part and is fixedly connected to the mounting platform; and a side wall of the connecting part has a concave-convex structure, and the space between an inner side of the housing and the connecting part is filled with a sealing material.

12 Claims, 9 Drawing Sheets

(51) Int. Cl.
*H01F 7/126* (2006.01)
*F25B 41/31* (2021.01)

(58) Field of Classification Search
USPC .......................................................... 62/210
See application file for complete search history.

(56) References Cited

FOREIGN PATENT DOCUMENTS

| | | | |
|---|---|---|---|
| CN | 204858797 | U | 12/2015 |
| CN | 106151646 | B | 4/2019 |
| CN | 209943646 | U | 1/2020 |
| JP | H-634205 | U | 5/1994 |
| JP | 2001343085 | A | 12/2001 |
| JP | 2002198221 | A | 7/2002 |
| JP | 2009159650 | A | 7/2009 |
| JP | 2016123218 | A | 7/2016 |

OTHER PUBLICATIONS

First Notice of Reasons for Refusal of KR1020217033438—Feb. 10, 2023.
Second Notice of Reasons for Refusal of JP2021556300—Aug. 9, 2023.
Third Notice of Reasons for Refusal of JP2021556300—Feb. 19, 2024.

* cited by examiner

EXPANSION VALVE COIL ASSEMBLY

CROSS-REFERENCE TO RELATED APPLICATIONS

The present disclosure is a National Stage application of International application No. PCT/CN2020/084661, filed on Apr. 14, 2020, which claims all benefits from China Patent Application No. 201920507947.X, filed on Apr. 15, 2019, and titled "EXPANSION VALVE COIL ASSEMBLY" in the China National Intellectual Property Administration, the content of which is hereby incorporated by reference.

TECHNICAL FIELD

The present disclosure relates to refrigeration technology, in particular, to an expansion valve coil assembly.

BACKGROUND

Currently, various solenoid valves are widely used as automatic control components in a refrigeration system, and expansion valve coils and valve bodies work together to switch on and off the refrigerant in the refrigeration system.

In conventional art, if the expansion valve coil is immersed in liquid for a long time, the liquid will permeate into a circuit board in the expansion valve coil, thereby affecting the performance of the expansion valve coil.

SUMMARY

In the present disclosure, an expansion valve coil assembly is provided according to embodiments of the present disclosure, wherein the expansion coil assembly includes a coil unit and a housing.

The coil unit is provided with a mounting platform. The mounting platform is provided, in a partially protruding manner, with a connecting portion. The housing is sleeved on the connecting portion, and fixedly connected to the mounting platform. The connecting portion has a plurality of sidewalls, a concave-convex structure is disposed on one of the plurality of sidewalls of the connecting portion. A sealing material is filled in a space between an inner side of the housing and the sidewall of the connecting portion.

Advantages of the expansion valve coil assembly in the present disclosure will be described herein. The coil unit is provided with a mounting platform. The mounting platform is provided, in a partially protruding manner, with a connecting portion. The housing is sleeved on the connecting portion, and connected to the mounting platform. The connecting portion has a plurality of sidewalls, a concave-convex structure is disposed on one of the plurality of sidewalls of the connecting portion. A sealing material is filled in a space between an inner side of the housing and the sidewall of the connecting portion. By disposing the concave-convex structure on one of the plurality of sidewalls of the connecting portion, a sealing area of the sealing material is increased, preventing a liquid from entering or permeating into the coil unit, thereby improving waterproofness of the expansion valve coil assembly.

In some embodiments, a recess is disposed on at least one sidewall of the connecting portion to form the concave-convex structure on a surface of the sidewall.

By arranging a recess on the at least one of the plurality of sidewalls, the liquid can be better insulated, so that the waterproofness of the expansion valve coil assembly can be improved.

In some embodiments, at least one recess is disposed on the first sidewall, the second sidewall, the third sidewall and the fourth sidewall of the connecting portion, respectively.

By arranging a recess on all of the four sidewalls, the concave-convex structure can be formed on four sidewalls of the connecting portion, so that the sealing area of the sealing material can be increased and the liquid around the expansion valve coil assembly will be harder to permeate into the expansion valve coil assembly from all the directions, thereby effectively improving waterproofness of the expansion valve coil assembly.

In some embodiments, the coil unit is provided with a mounting platform. The mounting platform is provided, in a partially protruding manner, with a connecting portion. The housing is sleeved on the connecting portion, and fixed to the mounting platform. A concave-convex structure is disposed on a sidewall of the connecting portion and/or an inner wall of the housing. A sealing material is filled in a space between an inner side of the housing and the sidewall of the connecting portion.

A concave-concave structure is disposed on at least one of the sidewall of the connecting portion and the inner wall of the housing, preventing a liquid from entering or permeating into the coil unit, so that the liquid is harder to permeate into the coil unit, thereby improving waterproofness of the expansion valve coil assembly.

BRIEF DESCRIPTION OF THE DRAWINGS

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

Figure 1A:
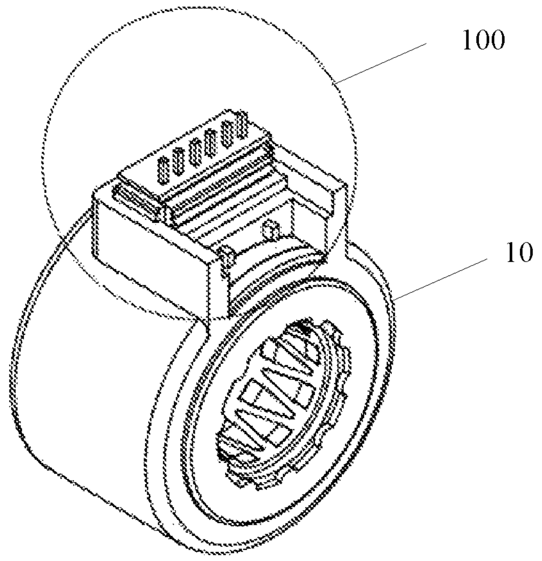
FIG. 1*a* is a front view of an expansion valve coil assembly in an embodiment of the present disclosure.

In the drawings, 10 represents a coil unit, 100 represents a connecting portion, 110 represents a mounting platform, 120 represents a connector, 101 represents a first sidewall, 102 represents a second sidewall, 103 represents a third sidewall, 104 represents a fourth sidewall, 1011 represents a first recess, 1012 represents a first protrusion, 1021 represents a second recess, 1022 represents a second protrusion, 1031 represents a third recess, 1032 represents a third protrusion, 1041 represents a fourth recess, 1042 represents a fourth protrusion, 1013 represents a fifth protrusion, 1023 represents a sixth protrusion, 1043 represents a seventh protrusion, 20 represents a housing, 201 represents a bottom, 202 represents a first wall, 203 represents a second wall, 204 represents a third wall, 2021 represents a projection, and 2022 represents a sealing strip.

DETAILED DESCRIPTION

In order to facilitate the understanding of the present disclosure, and to make the above-mentioned objectives, features, and advantages of the present disclosure more obvious and understandable, the specific embodiments of the present disclosure will be described in detail below with reference to the accompanying drawings. In the following description, many specific details are set forth in order to fully understand the disclosure, and the preferred embodiments of the disclosure are shown in the accompanying drawings. However, the present disclosure can be implemented in many different forms and is not limited to the implementation described herein. On the contrary, the purpose of providing these embodiments is to make the understanding of the disclosure of the present disclosure more thorough and comprehensive. The present disclosure can be implemented in many other ways different from those described herein, and those skilled in the art can make similar improvements without departing from the connotation of the present disclosure, so the present disclosure is not limited by the specific embodiments disclosed below.

In addition, terms “first” and “second” are only used for descriptive purposes, and cannot be understood as indicating or implying relative importance or implicitly indicating the number of indicated technical features. Therefore, the features defined with “first” and “second” may explicitly or implicitly include at least one of the features. In the description of the present disclosure, “a plurality of” means at least two, such as two, three, etc., unless specifically defined otherwise. In the description of the present disclosure, “several” means at least one, such as one, two, etc., unless otherwise specifically defined.

Unless otherwise defined, all technical and scientific terms used herein have the same meaning as commonly understood by those skilled in the technical field of the present disclosure. The terminology used herein is only for the purpose of describing specific embodiments, and is not intended to limit the disclosure. The term “and/or” as used herein includes any and all combinations of one or more related listed items.

An expansion valve coil assembly in the present disclosure will be described in details hereinafter.

Figure 1B:
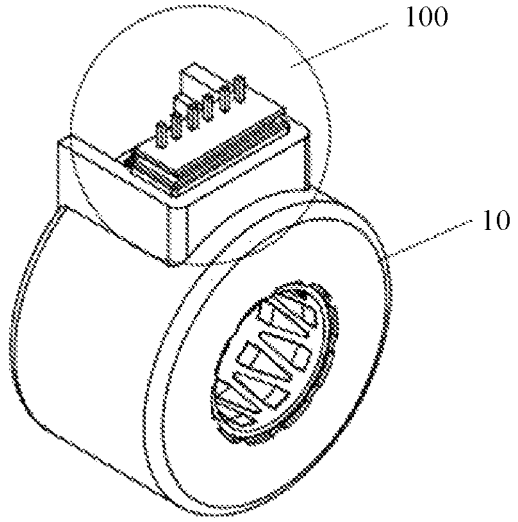
FIG. 1*b* is a side view of an expansion valve coil assembly in another embodiment of the present disclosure.
Figure 3:
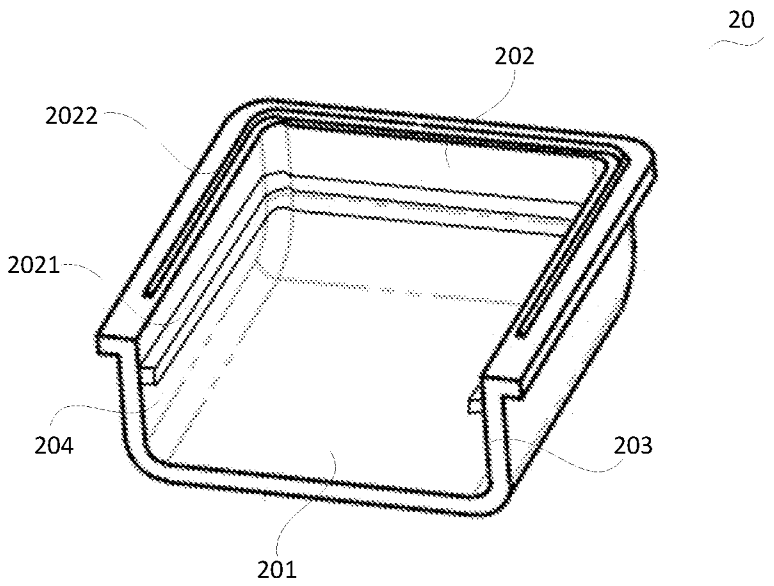
FIG. 3 is a schematic diagram of a housing of an expansion valve coil assembly in another embodiment.

FIG. 1*a* and FIG. 1*b* are structural schematic diagrams of an expansion valve coil assembly in an embodiment. Referring to FIG. 1*a*, FIG. 1*b* and FIG. 3, the expansion valve coil assembly can include a coil unit 10 and a housing 20.

The coil unit 10 can be provided with a mounting platform 110. The mounting platform 110 can be provided, in a partially protruding manner, with a connecting portion 100. The housing 20 can be sleeved on the connecting portion 100, and fixed to the mounting platform 110. The connecting portion 100 can have a plurality of sidewalls, a concave-convex structure can be disposed on one of the plurality of sidewalls of the connecting portion 100. A sealing material can be filled in a space between an inner side of the housing 20 and the sidewall of the connecting portion 100.

The coil unit 10 can include a winding member and a leading wire member. The winding member can include a stator polar plate, a stator housing, a framework and an enameled wire winding on the skeleton. A leading-out end of the enameled wire can be connected with a contact pin. The winding member can be enclosed by a layer of resin via a process of injection molding, forming a packaging layer. A connecting portion 100 can be arranged on the coil unit 10, and the leading wire member can be connected with the winding member via the connecting portion 100. In details, the leading wire member can include a leading wire and a circuit board connecting with an end of the leading wire. An end of the contact pin can permeate through a hole preset on the circuit board, and can be connected with the connecting portion 100 by a process of tin soldering. The connecting portion 100 and the coil unit 10 can be an integrated structure. During manufacturing of the expansion valve coil assembly in plants, the coil unit 10 and the connecting portion 100 can be integrally produced, so that stability of the expansion valve coil can be improved.

The housing 20 can be sleeved on the connecting portion 100, and fixedly connected to the mounting platform 110. In details, the housing 20 can be covered around the external side of the circuit board, and be welded together with the mounting platform 110 by a process of ultrasonic welding, so that the housing 20 and the mounting platform 110 can be combined together to form an integral structure by welding. The housing 20 can be an insulation housing 20. By fixedly connecting the housing 20 to the mounting platform 110, the leading wire member in the coil can be better sealed.

The concave-convex structure can be disposed on one of the plurality of sidewalls of the connecting portion 100, the advantages of which will be described herein. Compared with a sidewall having a flat surface, the concave-convex structure disposed on the sidewall can have much more surfaces on the sidewall. When the sealing material is filled in the space between the housing 20 and the connecting portion 100, a contact surface between the sealing material and the sidewall can be larger, thereby facilitating sealing and insulation of the leading wire member inside the coil unit 10. The sealing material can be epoxy resin or other insulating materials, and the specific material will not be limited in the present embodiment.

The concave-convex structure disposed on the at least one sidewalls of the connecting portion 100 can be a step-shaped structure, a ripple-shaped structure or the like. Types of the concave-convex structure and depth of the concave-convex structure are not limited in the present embodiment, as long as a contact surface between the housing 20 and the connecting portion 100 can be increased. When the expansion valve coil assembly is disposed in a liquid, the liquid can permeate into the coil unit 10 from a junction between the housing 20 and the connecting portion 100, and gradually permeate to the leading wire member inside the coil unit 10 via the sealing material between the housing 20 and the connecting portion 100. In the present embodiment, by filling the sealing material in the space between the housing 20 and the connecting portion 100, flowing of the liquid is prevented in some degree, thereby reducing a permeating velocity of the liquid an improving waterproofness of the expansion valve coil. Moreover, by disposing the concave-convex structure on the at least one sidewall of the connecting portion 100, a sealing area of the sealing material can be improved, so that the liquid can be harder to permeate into the coil unit 10, thereby further improving the waterproofness of the expansion valve coil.

The expansion valve coil assembly can include a coil unit 10 and a housing 20. The coil unit 10 can be provided with a mounting platform 110. The mounting platform 110 can be provided, in a partially protruding manner, with a connecting portion 100. The housing 20 can be sleeved on the connecting portion 100, and fixedly connected to the mounting platform 110. The connecting portion 100 can have a plurality of sidewalls, and a concave-convex structure can be disposed on one of the plurality of sidewalls of the connecting portion. A sealing material can be filled in a space between an inner wall of the housing 20 and the sidewall of the connecting portion 100. By disposing the concave-convex structure on one of the plurality of sidewalls of the connecting portion, the sealing area of the sealing material can be increased and a distance for a liquid entering the coil unit 10 can be extended, so that the liquid can be harder to permeate into the coil unit 10, thereby improving waterproofness of the expansion valve coil assembly.

Figure 2A:
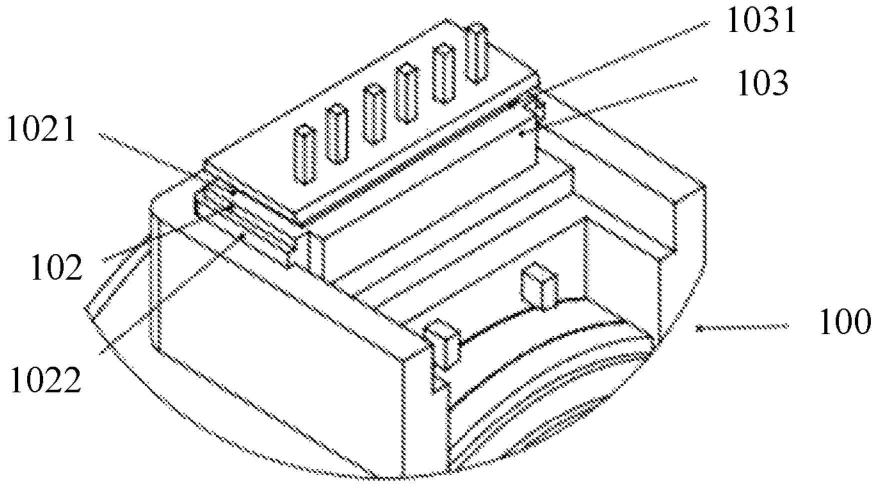
FIG. 2*a* is an enlarged view of a connecting portion of the expansion valve coil assembly in FIG. 1*a*.
Figure 2B:
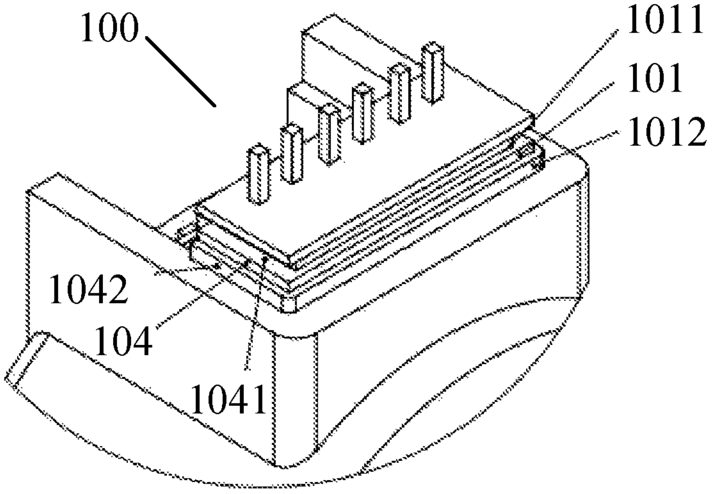
FIG. 2*b* is an enlarged view of a connecting portion of the expansion valve coil assembly in FIG. 1*b*.

In some embodiments, referring to FIG. 2*a*, FIG. 2*b* and FIG. 3, the connecting portion 100 can include a first sidewall 101, a second sidewall 102, a third sidewall 103 and a fourth sidewall 104; and a concave-convex structure can be disposed on one of the plurality of sidewalls of the connecting portion 100. In details, the first sidewall 101 and the third sidewall 103 can be symmetrically disposed, the second sidewall 102 and the fourth sidewall 104 can be symmetrically disposed. Referring to FIG. 3, the housing 20 can be a half-surrounded structure, that is, the housing 20 can include a bottom 201, a first wall 202, a second wall 203 and a third wall 204. The bottom 201 of the housing 20 and the connecting portion 100 can be symmetrically disposed, the first wall 202 of the housing 202 can be connected with the first sidewall 101 of the connecting portion 100, the second wall 203 of the housing 20 can be connected against the second sidewall 102 of the connecting portion 100, and the third wall 204 of the housing 20 can be connected with the fourth sidewall 104 of the connecting portion 100. A position corresponding to the third sidewall 103 of the connecting portion 100 can be not covered by the housing 20, and the sealing material can be filled from a position at the third sidewall 103 of the connecting portion 100, so as to seal the leading wire member in the coil unit 10.

In some embodiments, at least one of the plurality of sidewalls of connecting portion 100 can be provided with a recess, forming the concave-convex structure on one of the plurality of sidewalls. For example, at least one sidewall of the plurality of sidewalls of the connecting portion 100 can be provided with the recess. Alternatively, two or three sidewalls of the plurality of sidewalls of the connecting portion 100 can be provided with the recess; or, all of the plurality of sidewalls of the connecting portion 100 can be provided with the recess. When all of the four sidewalls of the connecting portion 100 are provided with the recess, the recess on each of the sidewalls can communicate with each other, forming a ring-shaped recess around a circumference of the connecting portion 100, so as to better isolate the liquid, thereby improving the waterproofness of the expansion valve coil assembly.

In some embodiments, a cross section along a direction perpendicular to corresponding sidewall of the recess is polygon-shaped, such as at least one of triangle-shaped or rectangle-shaped, or other irregular shapes. For example, all of the recesses on each of the plurality of sidewalls of the connecting portion 100 can be rectangle-shaped, so as to facilitate production; alternatively, the recess on the first sidewall 101 of the connecting portion 100 can be in triangle-shaped, and the recess on the second sidewall 102 of the connecting portion 100 can be in rectangle-shaped. It should be understood that the recess on each of the plurality of sidewalls of the connecting portion 100 can be in any shape, which is not limited in the present embodiment.

In some embodiments, referring to FIG. 2*a* and FIG. 2*b*, at least one recess can be arranged on all of the first sidewall 101, the second sidewall 102, the third sidewall 103 and the fourth sidewall 104.

All of the four sidewalls of the connecting portion 100 can be provided with a plurality of recesses, and the cross sections along the direction perpendicular to corresponding sidewall of the recesses arranged on different sidewalls can be the same, or not the same. In addition, cross sections along the direction perpendicular to corresponding sidewall of the recess arranged on the same sidewall can be different. For example, three recesses can be disposed on the first sidewall 101, and cross sections along a direction perpendicular to the first sidewall 101 of the three recesses can be in triangle-shaped, rectangle-shaped and round/quasi-circular-shaped, respectively.

In the present embodiment, recesses can be disposed on all of the four sidewalls of the connecting portion 100, wherein, a first recess 1011 can be disposed on the first sidewall 101, a second recess 1021 can be disposed on the second sidewall 102, a third recess 1031 can be disposed on the third sidewall 103, and a fourth recess 1041 can be disposed on the fourth sidewall 104. Cross sections along directions perpendicular to the corresponding sidewalls of the first recess 1011, the second recess 1021, the third recess 1031 and the fourth recess 1041 can be in rectangle-shaped, forming a ring-shaped recess along the circumference of the connecting portion 100. By disposing the recesses on all of the four sidewalls of the connecting portion 100, the concave-convex structure can be formed on surfaces of all the four sidewalls of the connecting portion 100, so as to improve the sealing area of the sealing material and prevent the liquid from permeating into the expansion valve coil assembly around, thereby effectively improving waterproofness of the expansion valve coil assembly.

In addition, a depth and a width of the recess can be adaptively adjusted by one of ordinary skill in the art according to design details and needs. For example, the depth of the recess can be adjusted at different positions of the recess.

In some embodiments, the depths of the plurality of recesses arranged on the same sidewall can be the same; alternatively, the depths of the plurality of recesses arranged on the same sidewall can reduce in a gradient; and, alternatively, the depths of the plurality of recess arranged on the same sidewall can increase in a gradient, so as to prevent the liquid from converging at the coil unit 10 and achieve better insolation performance. In the present embodiment, the plurality of recesses arranged on the same sidewall can have the same depth.

In some embodiments, referring to FIG. 2*a* and FIG. 2*b*, the first sidewall 101, the second sidewall 102, and the fourth sidewall 104 can include a protrusion. Wherein, a first protrusion 1012 can be disposed on the first sidewall 101, a second protrusion 1022 can be disposed on the second sidewall 102, and a fourth protrusion 1042 can be disposed on the fourth sidewall 104.

The protrusion and the connecting portion 100 can be an integral structure; alternatively, the protrusion can be independently disposed, and connected with the sidewall of the connecting portion 100. When the protrusion is independently disposed, a material of the protrusion can be the same as that of the connecting portion 100, or can be different with that of the connecting portion 100. The protrusion and the recess can be disposed at intervals, so as to further increase the sealing area of the sealing material, thereby preventing the liquid from entering or permeating into the unit coil 10 and improving waterproofness of the expansion valve coil assembly.

Figure 4A:
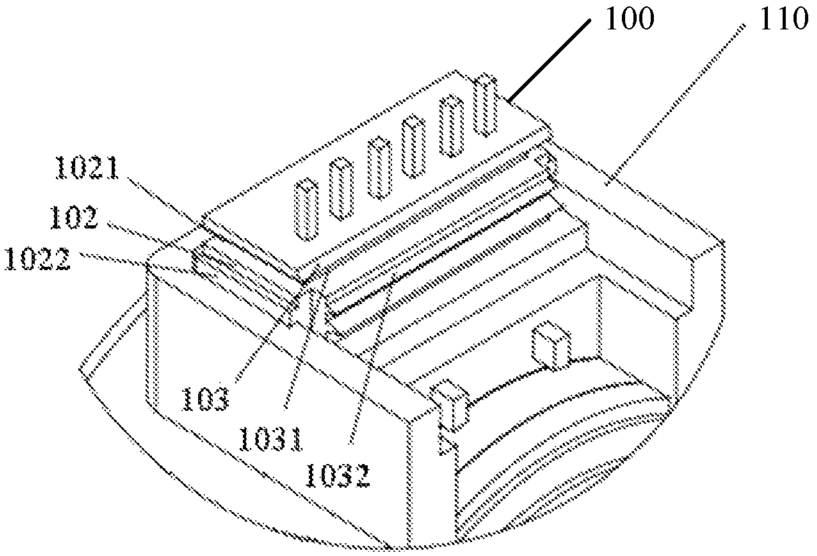
FIG. 4*a* is an enlarged view of a connecting portion of the expansion valve coil assembly of FIG. 1*a* in another embodiment.
Figure 4B:
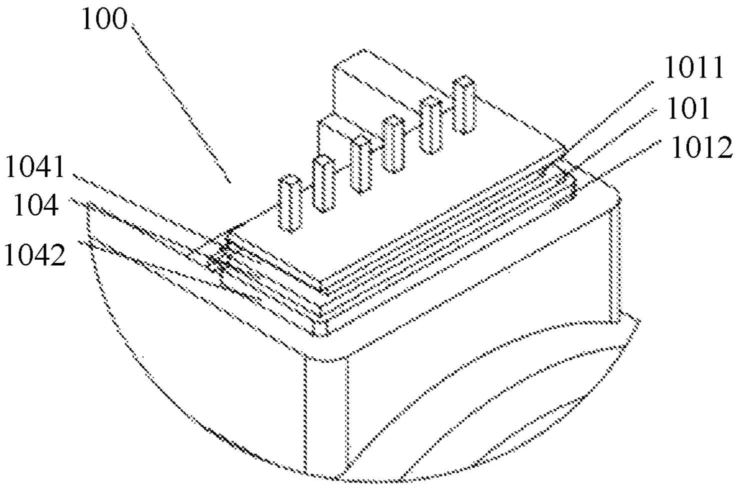
FIG. 4*b* is an enlarged view of a connecting portion of the expansion valve coil assembly of FIG. 1*b* in another embodiment.

In some embodiments, referring to FIG. 4*a* and FIG. 4*b*, a third protrusion 1032 can be disposed on the third sidewall 103 of the connecting portion 100, i.e., all of the four sidewalls of the connecting portion 100 can be provided with the recess and the protrusions, wherein the recesses and the protrusions can be disposed at intervals. In the present embodiment, the concave-convex structure can be disposed on all of the four sidewalls of the connecting portion 100, and degree of concave and convex can be enlarged by alternately disposing the recesses and the protrusions. Therefore, combination area between the housing 20 and each of the four sidewalls of the connecting portion 100 can be further increased, so that it is harder for the liquid around to permeate into the expansion valve coil assembly, thereby effectively improving waterproofness of the expansion valve coil assembly.

Figure 5A:
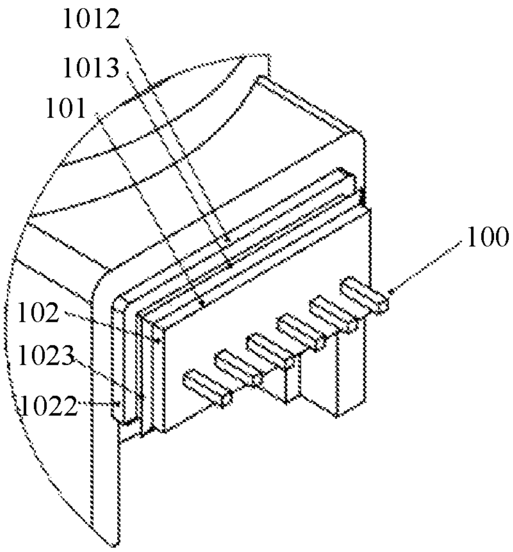
FIG. 5*a* is an enlarged view of a connecting portion of the expansion valve coil assembly of FIG. 1*a* in another embodiment.
Figure 5B:
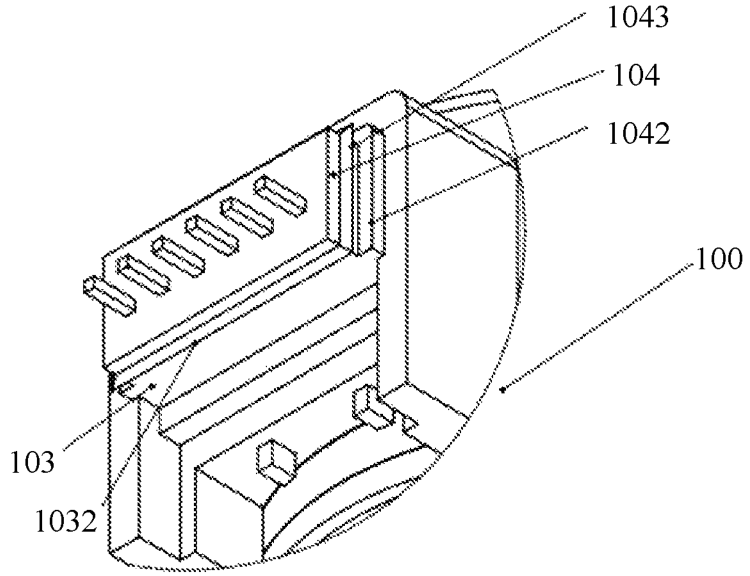
FIG. 5*b* is an enlarged view of a connecting portion of the expansion valve coil assembly of FIG. 1*b* in another embodiment.

In some embodiments, the protrusion can be arranged on at least one of the plurality of sidewalls of the connecting portion 100, so as to form the concave-convex structure on at least one surface of the plurality of sidewalls of the connecting portion. Referring to FIG. 5*a* and FIG. 5*b*, at least one protrusion can be arranged on all of the first sidewall 101, the second sidewall 102, the third sidewall 103 and the fourth sidewall 104. Wherein, a first protrusion 1012 can be disposed on the first sidewall 101, a second protrusion 1022 can be disposed on the second sidewall 102, a third protrusion 1032 can be disposed on the third sidewall 103, and a fourth protrusion 1042 can be disposed on the fourth sidewall 104.

Arranging the protrusions on all of the four sidewalls of the connecting portion 100 can increase the sealing area of the sealing material to a larger degree, so that the liquid around can be harder to permeate into the expansion valve coil assembly, thereby effectively improving waterproofness of the expansion valve coil assembly.

In some embodiments, a cross section perpendicular to the corresponding sidewall of the protrusion can be polygon-shaped, such as at least one of triangle-shaped and rectangle-shaped, or other irregular-shaped. In addition, a depth and a width of the protrusion can be adaptively adjusted by one of ordinary skill in the art according to design details and needs. A plurality of protrusions can be arranged on all of the four sidewalls of the connecting portion 100, and cross sections of protrusions arranged on different sidewalls can be at least one of triangle-shaped and rectangle-shaped. Alternatively, cross sections of the plurality of protrusions arranged on the same sidewall can be different. For example, three protrusions can be arranged on the first sidewall 101, and the cross sections of the three protrusions can be in triangle-shaped, rectangle-shaped and cylinder-shaped, respectively.

In the present embodiment, two protrusions can be arranged on all of a first sidewall 101, a second sidewall 102 and a fourth sidewall 104, wherein a first protrusion 1012 and a fifth protrusion 1013 can be arranged on the first sidewall 101, a second protrusion 1022 and a sixth protrusion 1023 can be arranged on the second sidewall 102, a fourth protrusion 1042 and a seventh protrusion 1043 can be arranged on the fourth sidewall 104, and a third protrusion 1032 can be arranged on the third sidewall 103. A shape of the first protrusion 1012, a shape of the second protrusion 1022 and a shape of the fourth protrusion 1042 can be the same, and a thickness of the first protrusion 1012, a thickness of the second protrusion 1022 and a thickness of the fourth protrusion 1042 can be the same. A shape of the third protrusion 1032, a shape of the fifth protrusion 1013, a shape of the sixth protrusion 1023 and a shape of the seventh protrusion 1043 can be the same, and a thickness of the third protrusion 1032, a thickness of the fifth protrusion 1013, a thickness of the sixth protrusion 1023 and a thickness of the seventh protrusion 1043 can be the same.

By arranging protrusions on all of the four sidewalls of the connecting portion 100, the concave-convex structures can be formed on the surfaces of the four sidewalls of the connecting portion 100, so as to increase the sealing area of the sealing material, so that the liquid around can be harder to permeate into the expansion valve coil assembly, thereby effectively improving waterproofness of the expansion valve coil assembly.

Figure 6:
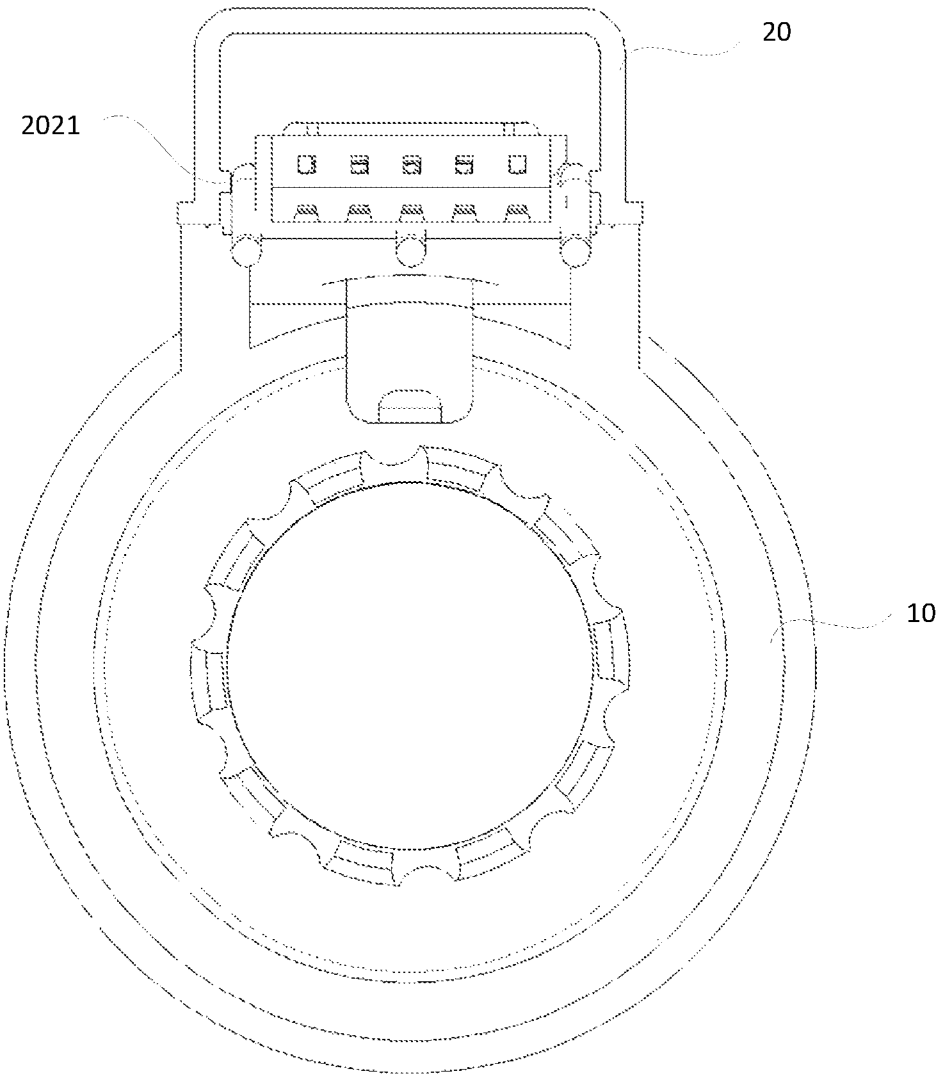
FIG. 6 is an assembly drawing of an expansion valve coil assembly in another embodiment.

In some embodiments, referring to FIG. 3 and FIG. 6, another expansion valve coil assembly can be disclosed. The expansion valve coil assembly can include a coil unit 10 and a housing 20. The coil unit 10 can be provided with a mounting platform 110. The mounting platform 110 can be provided, in a partially protruding manner, with a connecting portion 100. The housing 20 can be sleeved on the connecting portion 100, and fixed to the mounting platform 110. A sidewall of the connecting portion and/or an inner side of the housing can include a concave-convex structure. A sealing material can be filled in a space between an inner side of the housing 20 and the sidewall of the connecting portion 100.

In some embodiments, the concave-convex structure can be independently arranged on the sidewalls of the connecting portion 100; alternatively, can be independently arranged on the inner side of the housing 20; or, can be arranged on both the sidewall of the connecting portion 100 and the inner side of the housing 20. The connecting portion 100 can include a first sidewall 101, a second sidewall 102, a third sidewall 103 and a fourth sidewall 104. At least one sidewall of the connecting portion 100 can include the concave-convex structure. In details, the first sidewall 101 and the third sidewall 103 can be symmetrically disposed; and the second sidewall 102 and the fourth sidewall 104 can be symmetrically disposed. The housing 20 can be a half-surrounded structure including a bottom 201, a first wall 202, a second wall 203 and a third wall 204. The housing 20 can be sleeved on the connecting portion 100, the first wall 202 of the housing 20 can abut against the first sidewall 101 of the connecting portion 100; the second wall 203 of the housing 20 can abut against the second sidewall 102 of the connecting portion 100; and the third wall 204 of the housing 20 can abut against the fourth sidewall 104 of the connecting portion 100. The recess and/or the protrusion can be arranged on at least one of the first vertical surface 202, the second vertical surface 203 and the third vertical surface 204. In details, the concave-convex structure can be arranged on all of the first vertical surface 202, the second vertical surface 203, and the third vertical surface 204 of the housing 20 abutting against the connecting portion 100. The concave-convex structure can include a step-shaped structure or a ripple-shaped structure. In some embodiments, a projection 2021 can be arranged on the first wall 202, the second wall 203 and the third wall 204. A sealing strip can be further arranged on the first wall 202, the second wall 203 and the third wall 204. The sealing strip 2022 can be configured for improving sealing performance between the housing 20 and the connecting portion 100 when the housing 20 is sleeved on the connecting portion 100, i.e., improving waterproofness. The concave-convex structure can be disposed on the first sidewall 101, the second sidewall 102, the third sidewall 103 and the fourth sidewall 104 of the connecting portion 100. In details, the concave-convex structure can include the recess and/or the protrusion.

Figure 7:
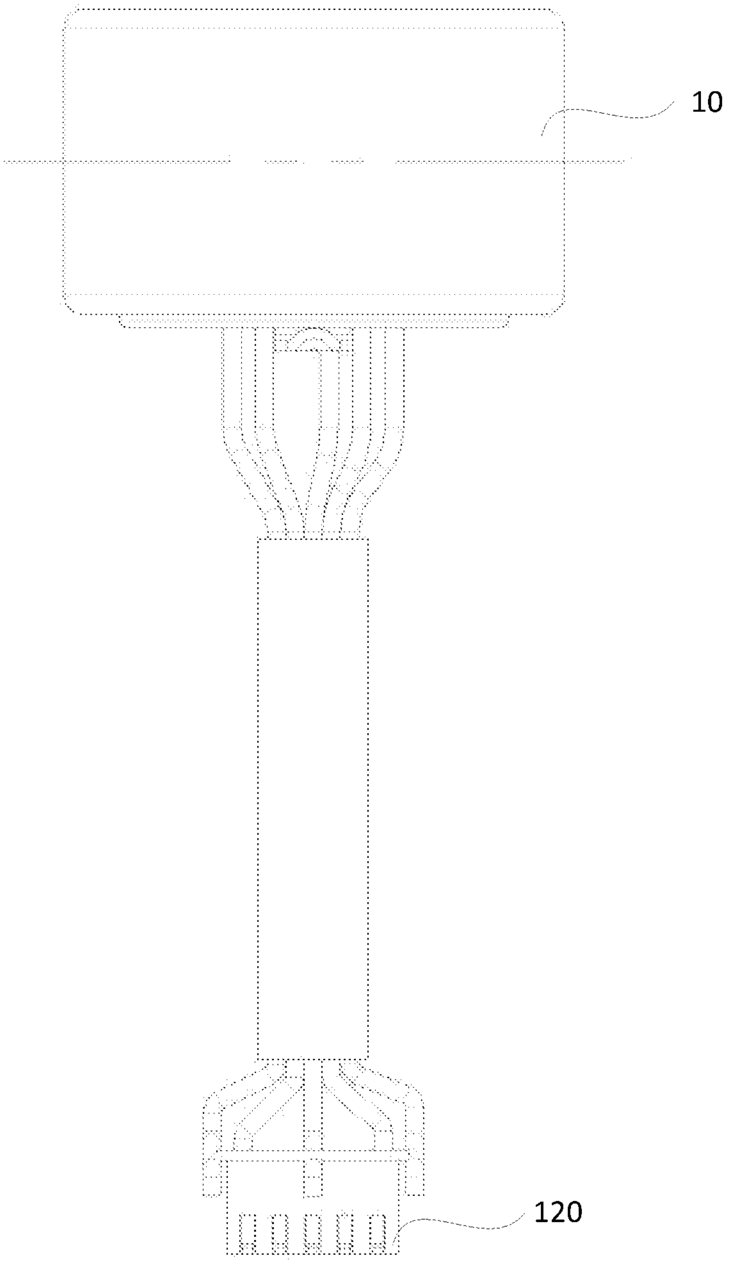
FIG. 7 is a front view of an expansion valve coil assembly in another embodiment in an using state.
Figure 8:
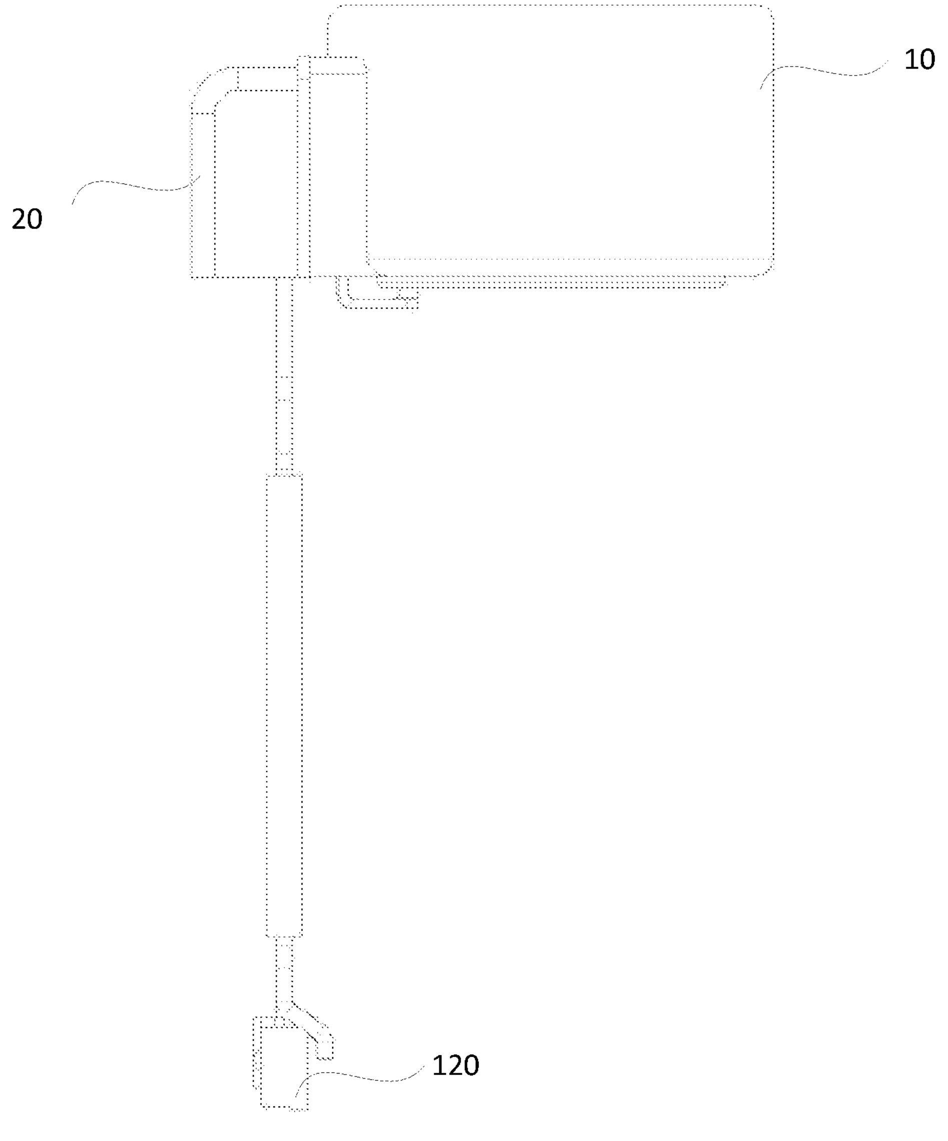
FIG. 8 is a side view of an expansion valve coil assembly in an embodiment in an using state.
Figure 9:
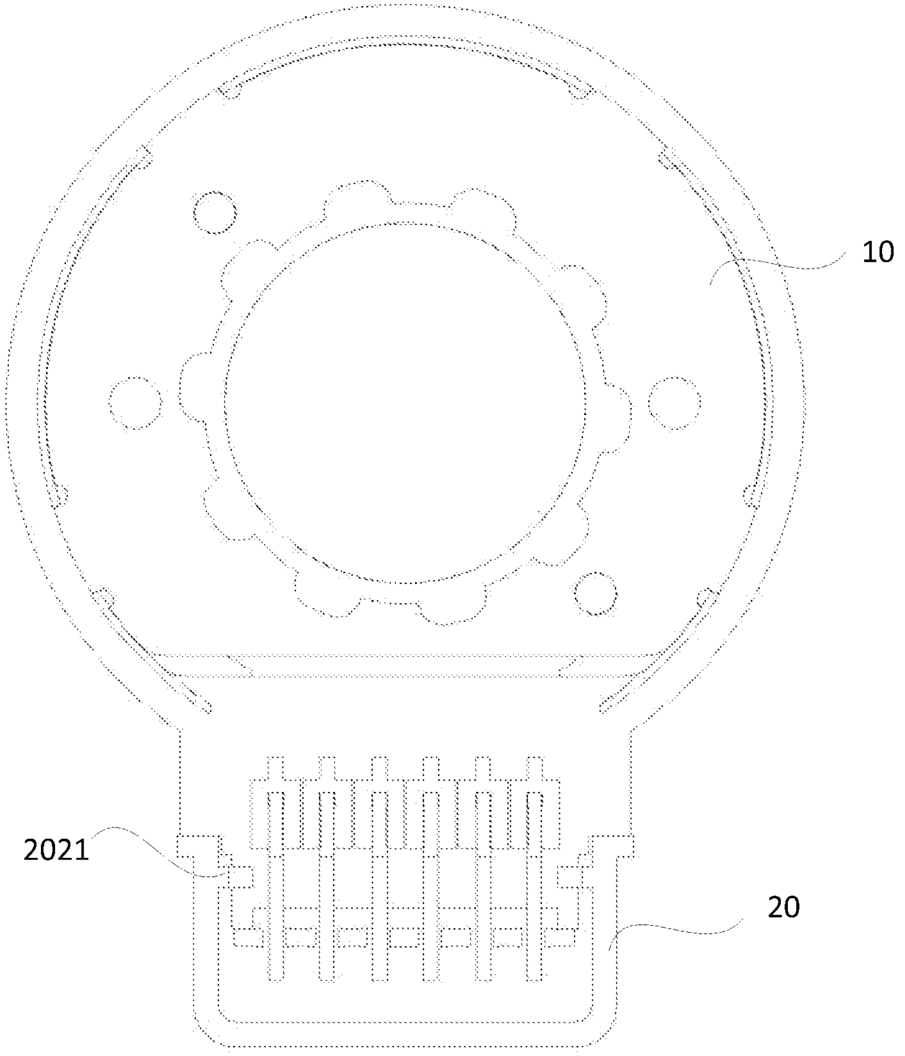
FIG. 9 is a cross-section view of an expansion valve coil assembly in another embodiment in an using state.

In some embodiments, referring to FIG. 7 to FIG. 9, contact pin of the coil unit 10 can penetrate through a hole preset on the circuit board and be connected with the circuit board. The circuit board can be connected with a connector 120 via the leading wire, and connected with an external device via the connector 120.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An expansion valve coil assembly, characterized by comprising, a coil unit and a housing, wherein the coil unit is provided with a mounting platform;

the mounting platform is provided with a connecting portion, and the connecting portion protrudes out from the mounting platform;

the housing is sleeved on the connecting portion, and fixedly connected to the mounting platform;

the connecting portion has a plurality of sidewalls; and a sealing material is filled in a space between an inner side of the housing and the sidewall of the connecting portion;

the plurality of sidewalls of the connecting portion are defined as a first sidewall, a second sidewall, a third sidewall and a fourth sidewall, the first sidewall and the third sidewall are symmetrically disposed, the second sidewall and the fourth sidewall are symmetrically disposed, a first recess is disposed on the first sidewall, a second recess is disposed on the second sidewall, a third recess is disposed on the third sidewall, and a fourth recess is disposed on the fourth sidewall; and the first recess, the second recess, the third recess and the fourth recess are in communication with each other, to form a ring-shaped recess around a circumference of the connecting portion.

2. The expansion valve coil assembly of claim 1, wherein, the housing and the mounting platform are combined together to form an integral structure by welding.

3. The expansion valve coil assembly of claim 1, wherein, a cross section of each of the first recess, the second recess, the third recess and the fourth recess along a direction perpendicular to corresponding sidewall is polygon-shaped.

4. The expansion valve coil assembly of claim 1, wherein each of the first sidewall, the second sidewall, and the fourth sidewall comprises a protrusion.

5. The expansion valve coil assembly of claim 4, wherein a protrusion is disposed on the third sidewall.

6. The expansion valve coil assembly of claim 1, wherein a protrusion is disposed on the at least one of the first sidewall, the second sidewall, the third sidewall and the fourth sidewall of the connecting portion.

7. The expansion valve coil assembly of claim 6, wherein, at least one protrusion is disposed on each of the first sidewall, the second sidewall, the third sidewall and the fourth sidewall of the connecting portion, respectively.

8. The expansion valve coil assembly of claim 5, wherein a cross section of the at least one protrusion disposed on each of the first sidewall, the second sidewall, the third sidewall and the fourth sidewall of the connecting portion is polygon-shaped.

9. The expansion valve coil assembly of claim 1, wherein an inner side of the housing is provided with a protrusion.

10. The expansion valve coil assembly of claim 9, wherein, the housing is a half-surrounded structure comprising a bottom, a first wall, a second wall and a third wall;

the first wall abuts against the first sidewall;

the second wall abuts against the second sidewall; and the third wall abuts against the fourth sidewall.

11. The expansion valve coil assembly of claim 10, wherein the protrusion is arranged on at least one of the first wall, the second wall and the third wall.

12. The expansion valve coil assembly of claim 10, wherein the protrusion comprises a ripple-shaped structure.

* * * * *